E. W. GOODWIN.
ADJUSTABLE WINDSHIELD SUPPORT.
APPLICATION FILED JUNE 17, 1919.

1,381,116.

Patented June 14, 1921.

Inventor
Edward W. Goodwin
By his Attorney Lloyd Blackmare

UNITED STATES PATENT OFFICE.

EDWARD W. GOODWIN, OF DETROIT, MICHIGAN, ASSIGNOR TO GENERAL MOTORS CORPORATION, OF DETROIT, MICHIGAN, A CORPORATION OF DELAWARE.

ADJUSTABLE WINDSHIELD-SUPPORT.

1,381,116.     Specification of Letters Patent.     Patented June 14, 1921.

Application filed June 17, 1919.  Serial No. 304,971.

*To all whom it may concern:*

Be it known that I, EDWARD W. GOODWIN, a citizen of the United States, and resident of Detroit, Wayne county, State of Michigan, have invented certain new and useful Improvements in Adjustable Windshield-Supports, of which the following is a specification.

My invention relates to wind shields for use with automobiles, and particularly to means for supporting the two sides of the wind shield from or by vertically extending stanchions located one at each side of the vehicle.

The object of my invention is to provide improved supporting and adjusting means for the two sides of a wind shield whereby the same may be firmly supported from the upright stanchions, while at the same time providing for the adjustment of the shield to different angles, as is desirable in wind shield construction.

A further object of my invention is to provide wind shield supporting mechanism which will be simple in construction and cheap to manufacture, and which at the same time will support the wind shield in a firm manner, and permit its adjustment with a minimum of effort on the part of the operator of the vehicle.

The drawing accompanying and forming a part of this specification illustrates the preferred embodiment of my invention.

Figure 1:
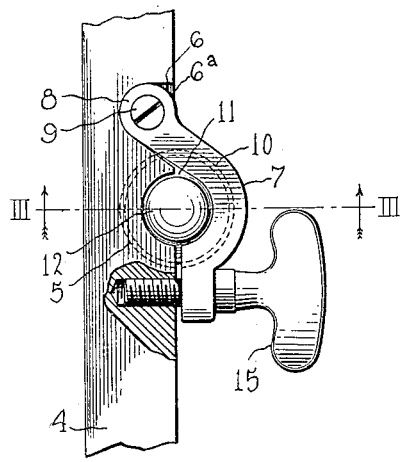
Figure 1 is a fragmentary view showing my improved wind shield support in side elevation.

Referring to the drawing, the reference numeral 4 designates an upright supporting stanchion, two such stanchions being employed, one located upon each side of the vehicle as will be appreciated, although only one of them is shown as the supports for the wind shield are the same at each end thereof, or at each side of the vehicle.

Figure 3:
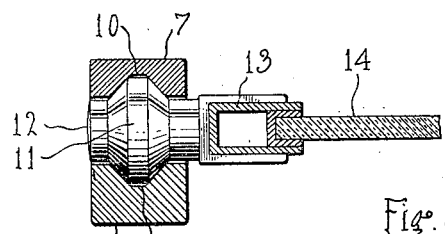
Fig. 3 is a fragmentary sectional view taken upon a horizontal plane indicated by the line 3—3 of Fig. 1; and, Fig. 4 is a view showing a modified form of my invention in side elevation.

The stanchion 4 is provided with a semi-circular seat 5 shown in section in Fig. 3, and in dotted lines in Fig. 1; said seat being approximately V-shaped in cross section as will be understood from Fig. 3. The stanchion 4 is also provided with two recesses 6, 6 located one upon each side thereof whereby a centrally disposed lug $6^a$ is provided between the said recesses.

Pivotally connected with the stanchion 4 is a latch member 7 having lugs 8 at one of its ends, said lugs being spaced apart from one another and lying within the recesses 6 aforesaid; and said latch member is secured in place by means of a screw 9 extending through the lugs 8 of the latch member, and through the central lug $6^a$ provided by the recess 6. The latch member is also provided with a semicircular seat 10 approximately V-shaped in cross-section, as shown in Fig. 3, which seat registers with the semi-circular seat in the stanchion when the latch member is in the position shown in the drawing to thereby provide an internal semi-circular seat within which the enlarged circular head 11 of a trunnion 12 lies; the form of the head corresponding with that of the recess within which it lies, as will be appreciated from Fig. 3 of the drawing.

The trunnion 12 serves as a support for the sash member 13 at one side of the wind shield and said sash supports the glass 14, as will be appreciated. The latch member 7 is provided with a hole adjacent its lower end, and 15 designates a tightening screw which extends through the hole aforesaid and is in threaded engagement with the upright 4 in the form illustrated in Figs. 1 and 2. It will therefore be appreciated that the free lower end of the latch member may be drawn toward the stanchion by means of the screw 15, and that by tightening the screw the enlarged head 11 of the trunnion 12 may be clamped in position and held in such a manner as to prevent rotary movement thereof, thus holding the wind shield in whatever angular position it may be adjusted into.

Figure 2:
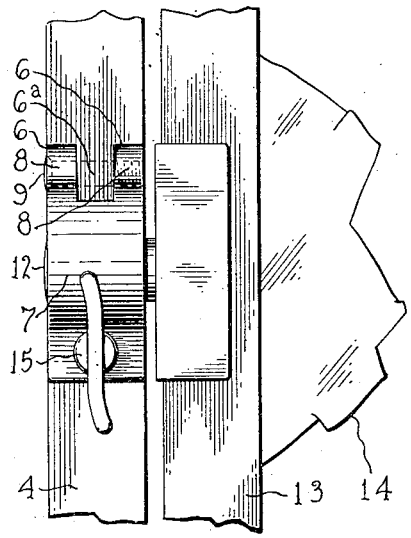
Fig. 2 is a fragmentary view showing the same in rear elevation, or as seen from the position of the operator of the vehicle.
Figure 4:
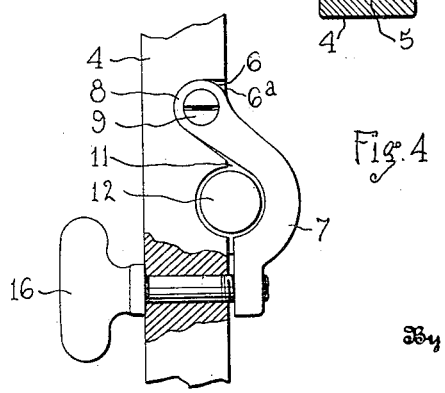

In the form of my invention shown in Figs. 1 and 2 the handle of the tightening screw 15 is next to the operator of the vehicle so that the wind shield may be adjusted conveniently, and with a minimum of effort on the part of the operator. In the form of my invention shown in Fig. 4, however, the tightening screw 16 extends through an opening provided in the stanchion 4, and the free end thereof is in threaded engagement with the free lower end of the latch member 7. This modified form of my invention obviously operates in substantially the same manner as the form shown in Figs. 1 and 2 to drawn the latch member into firm engagement with the enlarged head of the trunnion; the same end obviously being attained irrespective of whether the clamping screw passes loosely through the latch member and is in threaded engagement with the stanchion, or passes loosely through the stanchion and is in threaded engagement with the latch member.

Having thus described and explained my invention, I claim and desire to secure by Letters Patent:

1. In a wind shield supporting device for motor vehicles, an upright supporting stanchion having a semi-circular seat V-shaped in cross section formed therein and extending transversely from one side to the other thereof, oppositely located recesses formed in the sides of said stanchion, and a lug located between said recesses; a latch member having lugs at one end spaced apart from one another and adapted to lie within the recesses aforesaid, and a semi-circular seat V-shaped in cross section and so disposed as to register with the seat in said stanchion; a screw extending through said lugs and whereby said latch member is pivotally secured to said stanchion; a clamping screw in engagement with said latch member adjacent the free end thereof and whereby said free end may be drawn toward said stanchion; a frame member; and a trunnion carried by said frame member and having an enlarged circular head the periphery of which is V-shaped in cross section, and which head is adapted to lie within the seats aforesaid in said stanchion and latch member.

2. In a wind shield supporting device for motor vehicles, an upright supporting stanchion having a semi-circular seat V-shaped in cross section formed in its rear face and extending transversely from one side to the other thereof, oppositely located recesses formed in the sides of said stanchion at the rear side thereof and which recesses are arranged above said seat, and a lug located between said recesses; a latch member having two lugs spaced apart from one another at its upper end and lying within the recesses aforesaid, and a semi-circular seat V-shaped in cross section and so disposed as to register with the seat in said stanchion; a screw extending through said lugs and whereby said latch member is pivotally secured to said stanchion; a clamping screw in engagement with the lower free end of said latch member and whereby said lower end may be drawn toward said stanchion; a frame member; and a trunnion carried by said frame member and having an enlarged circular head the periphery of which is V-shaped in cross-section, and which head is adapted to lie within the seats aforesaid in said stanchion and latch member.

3. In a wind shield supporting device for motor vehicles, an upright supporting stanchion having a seat formed therein and extending transversely from one side to the other thereof, oppositely located recesses formed in the sides of said stanchion at the rear side thereof and which recesses are arranged above said seat, and a lug located between said recesses; a latch member having lugs at one end spaced apart from one another and adapted to lie within the recesses aforsaid, and a seat so disposed as to register with the seat in said stanchion; a screw extending through said lugs and whereby said latch member is pivotally secured to said stanchion; a clamping screw in engagement with said latch member adjacent the free end thereof and whereby said free end may be drawn toward said stanchion; a frame member; and a trunnion carried by said frame member and having an enlarged circular head, and which head is adapted to lie within the seats aforesaid in said stanchion and latch member.

In testimony whereof I affix my signature.

EDWARD W. GOODWIN.